July 24, 1956  W. GERSTENBERGER  2,755,871
FLUID DAMPER

Filed May 3, 1952  5 Sheets-Sheet 1

INVENTOR.
WALTER GERSTENBERGER
BY
M. B. Tasker
ATTORNEY

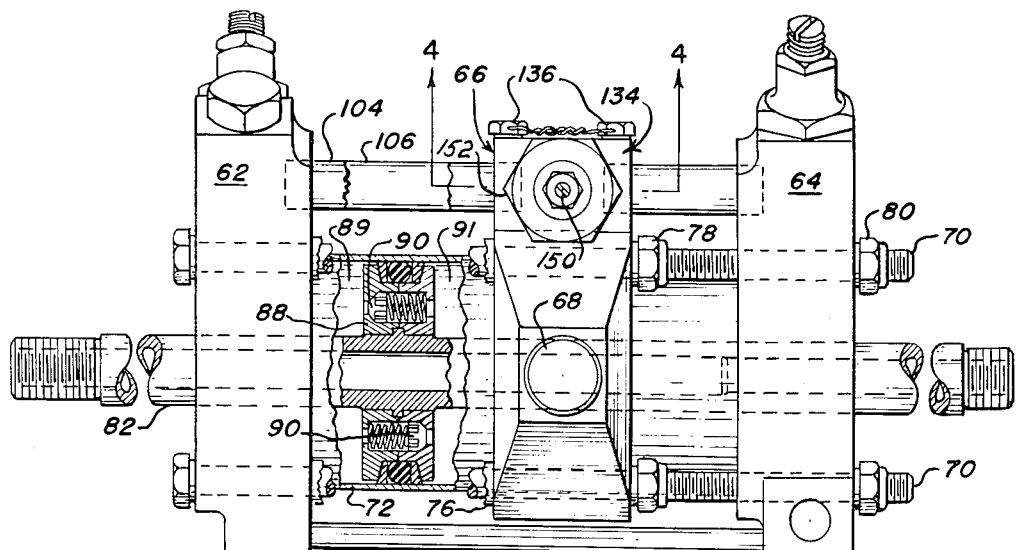
Fig. 3
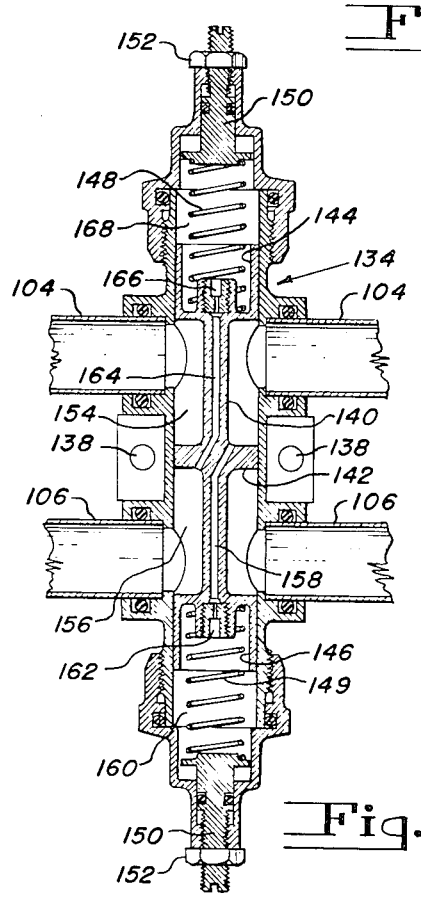
Fig. 4
Fig. 4a
INVENTOR.
WALTER GERSTENBERGER
BY
M. B. Tasher
ATTORNEY

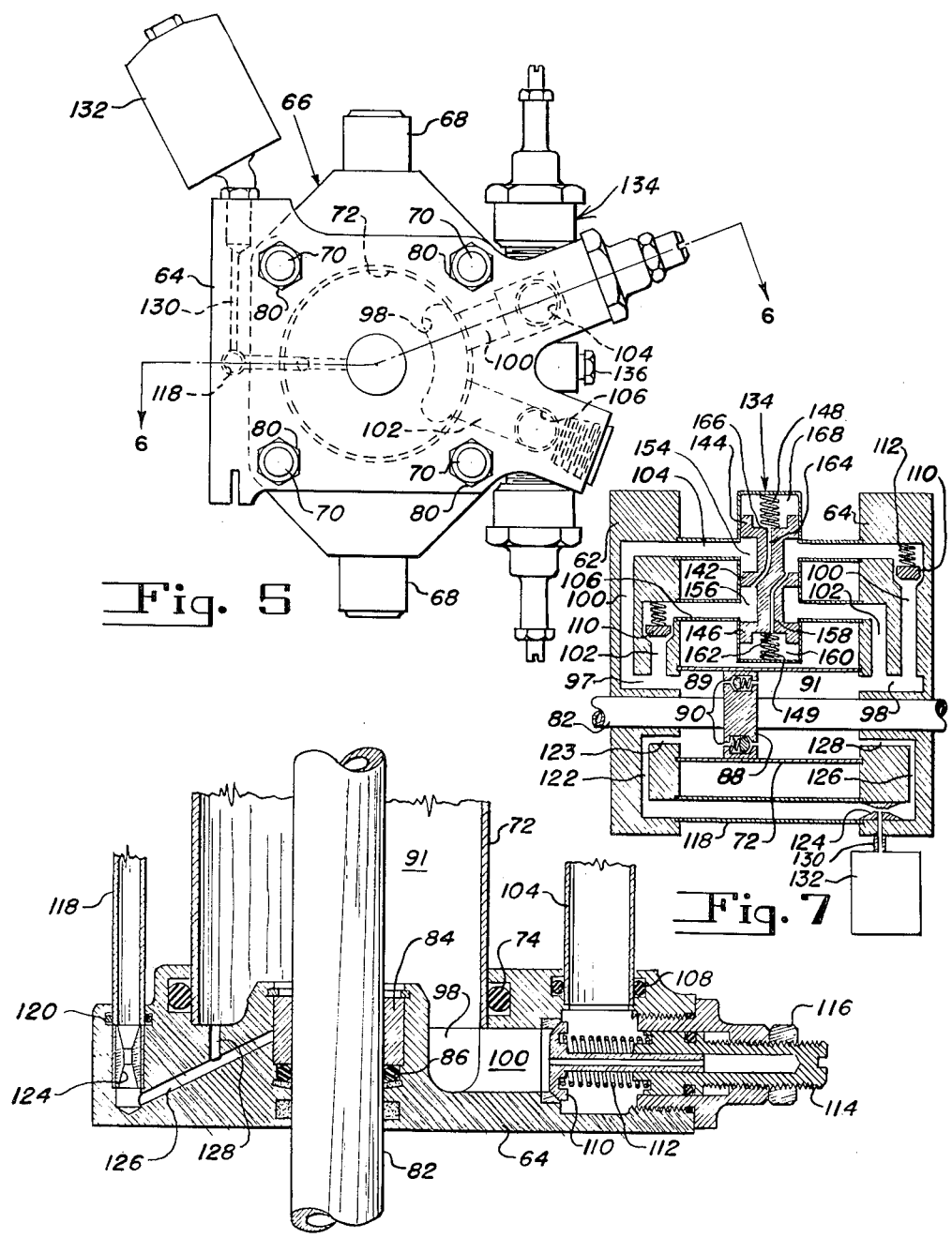

July 24, 1956

W. GERSTENBERGER 2,755,871

FLUID DAMPER

Filed May 3, 1952

INVENTOR
WALTER GERSTENBERGER
BY M. B. Tasker

July 24, 1956  W. GERSTENBERGER  2,755,871
FLUID DAMPER

Filed May 3, 1952  5 Sheets-Sheet 5

INVENTOR
WALTER GERSTENBERGER
BY M. B. Tasker
ATTORNEY

United States Patent Office 2,755,871
Patented July 24, 1956

2,755,871

FLUID DAMPER

Walter Gerstenberger, Milford, Conn., assignor to United Aircraft Corporation, East Hartford, Conn., a corporation of Delaware Application May 3, 1952, Serial No. 285,903

12 Claims. (Cl. 170—160.55)

This invention relates to rotary wing aircraft of the type in which the rotor blades are pivotally mounted for movement in the plane of their rotation about drag hinges, and is particularly concerned with improvements in hydraulic dampers used to control these lag-lead movements of the rotor blades. A damper of this type is shown in the Buivid Patent No. 2,554,774, issued May 29, 1951, and assigned to the assignee of this application.

Damping of the blade movements about their drag hinges is necessary to prevent ground resonance, the generation of vibrations in the blade in harmony with, and hence, forced by, vibrations of the aircraft which is supported on the ground by resilient gear. The vibrations originate as a small blade oscillation and rapidly build up to a large and dangerous one which can result in breakage of the blade or in overturning of the aircraft in an incredibly short time.

The damping requirements for preventing ground resonance are however not favorable for normal forward flight. In forward flight flapping of the blades takes place which due to Coriolis forces causes movements of the blades about their drag hinges. Also the big difference in the drag forces acting on the advancing and retreating blades results in further movement of the blades about their drag hinges. Hence large blade movements about the drag hinge pivots take place during normal flight and if the same damping effect which is required to prevent ground resonance is maintained in effect, the chordwise bending stresses in the blade spars will be extremely high and the blade life very short.

In the above-mentioned Buivid patent the blade damper is adjusted to provide the required damping to eliminate ground resonance when the ship is on or near the ground and the chordwise vibratory stresses in the blades are relatively low, and in forward flight when these stresses are high these stresses are relieved by pressure relief valves which are set to open just above the fluid pressures in the dampers which would occur under conditions favorable to ground resonance. It will thus be clear that in the Buivid damper the stress on the blades in flight can never be less than that determined by the necessary setting of the relief valves to protect the blades against ground resonance during take-off and landing.

It is an object of the present invention to provide improved means for controlling the damper forces so as to provide the optimum damper force both under flight conditions and under conditions favorable to ground resonance.

The basis for producing this desirable result is the difference in the natural period of vibration of the blades about their drag hinges on the ground and the frequency with which they are forced to vibrate in forward flight. In normal flight the forced frequency of the blade about its drag hinge is one per revolution, while on the ground the natural frequency of the blade is one per three or four revolutions.

It is accordingly a further object of this invention to provide mechanism for controlling the damper force of the blade dampers in response to the frequency of blade oscillations about their drag hinges to provide the high damper forces required on the ground while providing low damper forces in flight.

A still further object of the invention is to provide damper force controlling means operable to provide a high damper force when the ship is on the ground and the blade oscillation about the drag hinge has a low frequency, which will be inoperative when the ship is in flight and the blade frequency is high.

A still further object of the invention is to provide damper force control means which is independent of the main damper piston movement and which is capable of operation at a number of different damper positions, such as "power-on" or "power-off" positions of the blades.

A yet further object is generally to improve the construction and the operation of hydraulic dampers for rotary wing aircraft.

These and other objects of the invention will be pointed out in connection with the following description of a preferred embodiment of the invention shown in the accompanying drawings.

In these drawings:

Fig. 3 is an enlarged plan view of one of the dampers with the fluid reservoir omitted and parts broken away to facilitate illustration;

Fig. 4 is a section on line 4—4 of Fig. 3;

Fig. 4a is an enlarged detailed view showing the flapping and drag hinge pivots;

Fig. 5 is an end view of the damper taken from the right-hand end of Fig. 3 and rotated 90° into the normal damper position;

Fig. 6 is a section on line 6—6 of Fig. 5;

Fig. 7 is a diagrammatic view of the damper;

Figure 1:
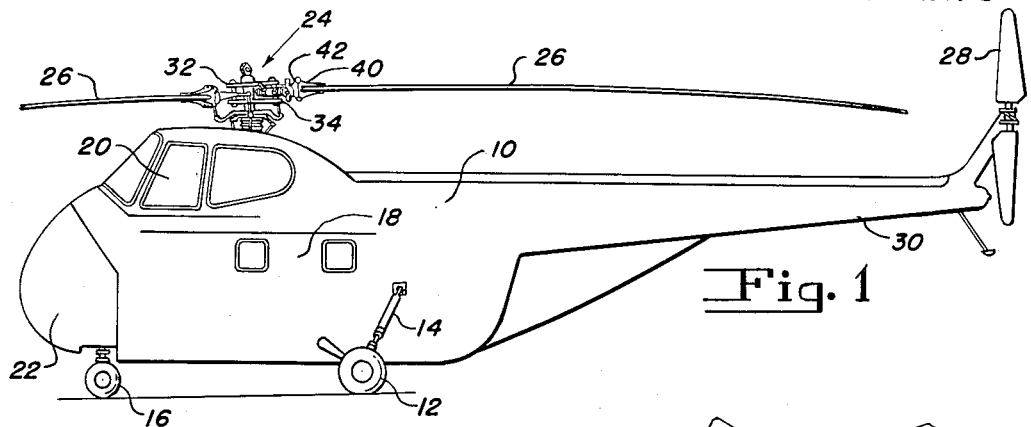
Fig. 1 is a side elevation of a helicopter having articulated rotor blades which are controlled by dampers embodying the present invention.
Figure 2:
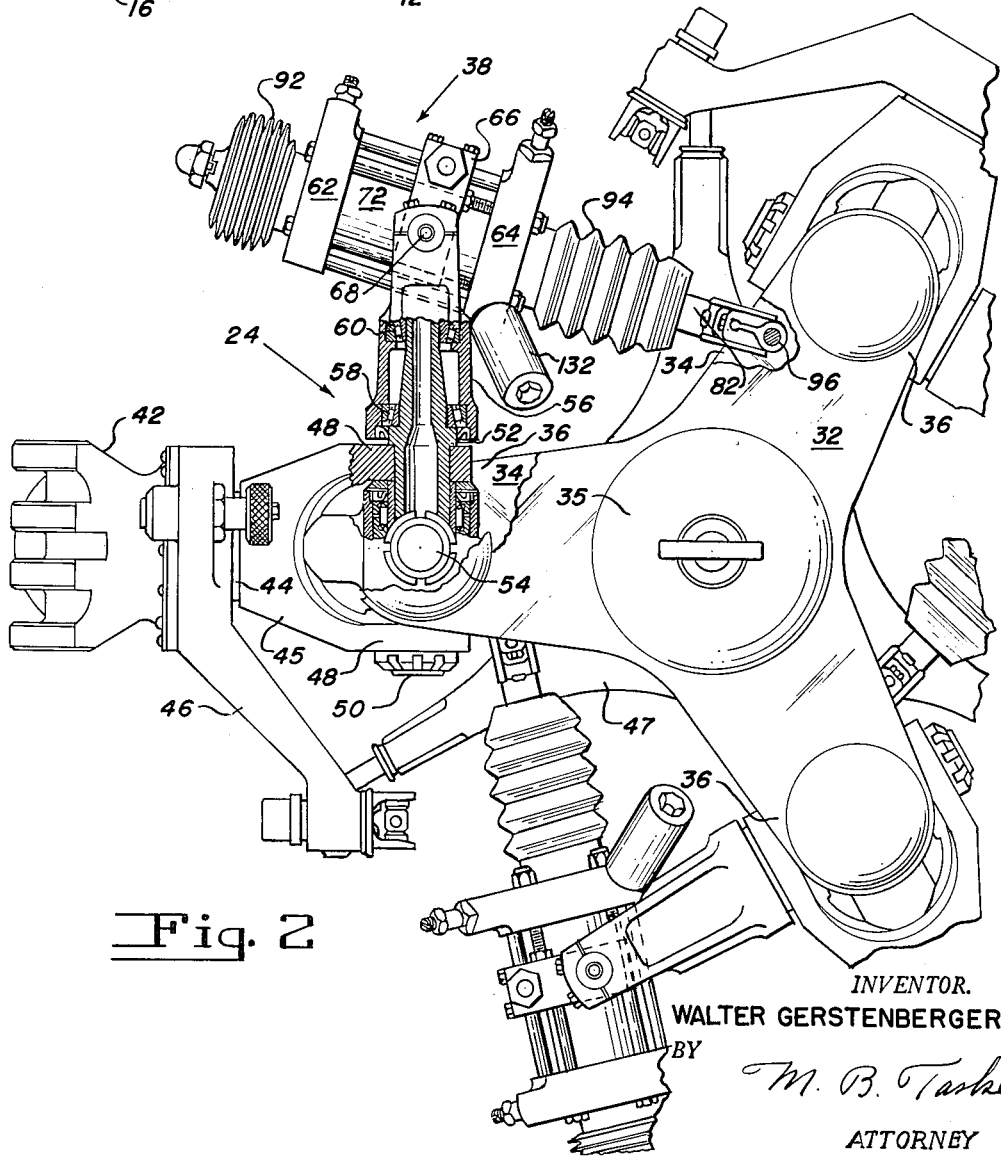
Fig. 2 is a plan view on an enlarged scale of the rotor head of the helicopter shown in Fig. 1, parts being broken away to facilitate illustration.
Figure 8:
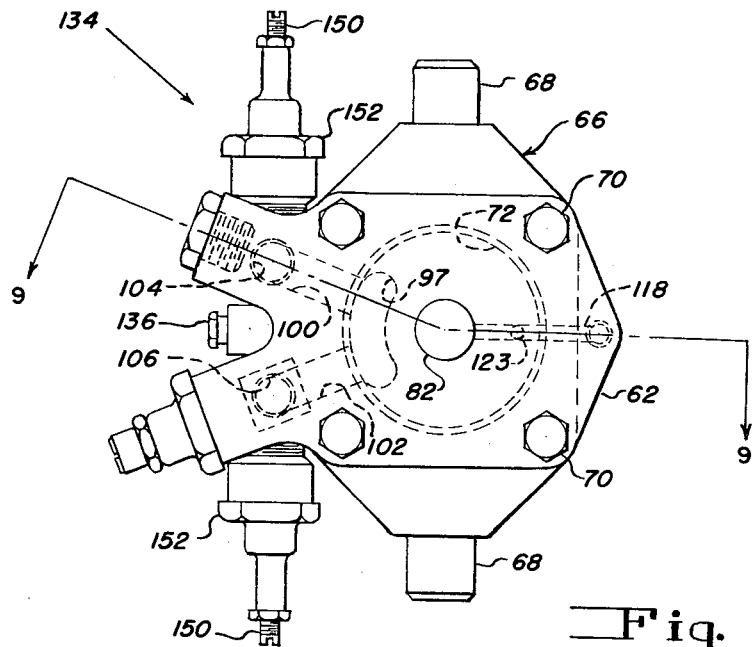
Fig. 8 is an end view of the damper similar to Fig. 5 from the left-hand end of Fig. 3.
Figure 9:
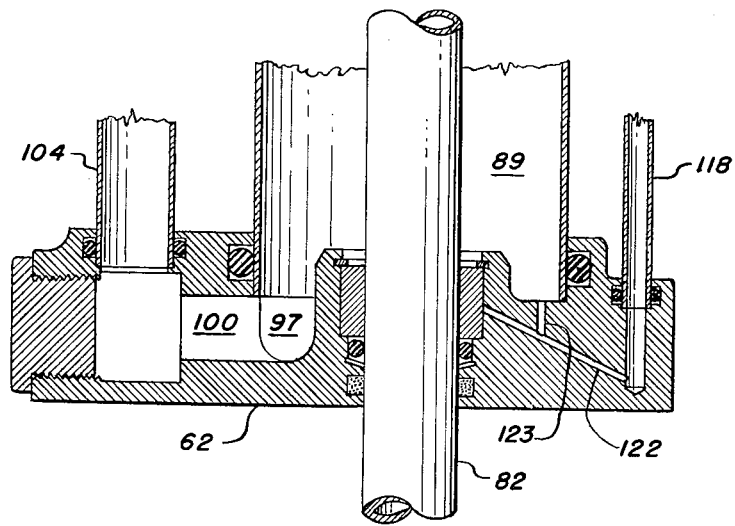
Fig. 9 is a section on line 9—9 of Fig. 8.

As shown in Fig. 1, the helicopter chosen to illustrate the invention consists of a body 10 supported when on the ground by landing gear including a pair of main wheels 12 which are controlled in their movements relative to the body by resilient oleo struts 14 and a pair of nose wheels 16 which are also connected to the body 10 by resilient means. The ship also includes a cargo or passenger compartment 18, a pilot compartment 20 and an engine compartment 22 located in the nose of the ship forward of the passenger compartment and beneath the pilot compartment. A rotor head generally indicated at 24 in Figs. 1 and 2 is driven through suitable shafting (not shown) and carries rotor blades 26 which are individually pivotally connected to the rotor head. The usual anti-torque tail rotor 28 is provided, on an extension 30 of the helicopter body, which is rotatable about a generally horizontal axis as is now common practice in single rotor helicopers.

The rotor head 24 (Fig. 2) consists essentially of upper and lower plates 32 and 34 rigidly secured together by a hub 35 which is secured to the rotor drive shaft. These spaced plates have a number of radially extended arms 36, herein three, corresponding to the number of rotor blades on the rotor. Each blade is provided with a hydraulic damper generally indicated at 38 and since the dampers and the blades are identical only one blade and its associated damper will be specifically described herein.

Each blade 26 has a root end fitting provided with a hinge member 40 (Fig. 1) which is pivoted to a like hinge member 42 (Fig. 2). The members 40 and 42 comprise the usual blade folding hinge. Hinge member 42 is mounted on a stub shaft 44 of flapping link 45 for rotation about the blade pitch changing axis in the usual manner and has a horn 46 which is suitably connected to the rotatable member of a swashplate 47 for providing cyclic and total pitch changes of the blade.

The inboard end of flapping link 45 (Fig. 4a) is in the form of a yoke having parallel arms 48 in which a flapping hinge pin 50 is rigidly mounted and which has a lateral extension 52 on which the damper 38, hereinafter to be described, is supported. The hinge pin 50 is journalled in a right angularly disposed drag hinge pin 54, the upper and lower extended ends of which are journalled in the upper and lower plates 32 and 34 respectively. The extension 52 carries a damper supporting yoke 56 which is rotatably supported on the flapping hinge extension 52 by bearings 58 and 60 as shown in Fig. 2.

The damper 38 as shown most clearly in Fig. 3 includes left and right-hand end fittings 62 and 64 and an intermediate fitting 66. The fitting 66, as is best shown in Fig. 5, carries a pair of trunnions 68 which are received in the extremities of damper supporting yoke 56 shown in Fig. 2. The fittings 62 and 64 (Fig. 3) are connected by four tie bolts 70 which clamp these fittings onto the ends of a cylinder 72, the opposite ends of which are received in recesses in the confronting faces of the end fittings. A suitable O-ring seal 74 is provided in each fitting, one of which is shown in Fig. 6. The fitting 66 is supported in its intermediate position surrounding cylinder 72 by the same tie rods 70, suitable spacing sleeves 76 being provided on the tie bolts 70 between end fitting 62 and fitting 66. Nuts 78 hold fitting 66 against the sleeves 76, and nuts 80 on the ends of tie bolts 70 serve to clamp the end fitting together on the cylinder. It will thus be evident that the cylinder element of the damper is pivotally supported about the generally vertical axis of its trunnions on the flapping link which itself is movable with the blade about the generally vertical drag hinge pin 54, as shown in Fig. 2.

The piston element of the damper includes a hollow piston rod 82 which extends axially through the damper cylinder 72 and through the end fittings 62 and 64, a bearing 84 and an O-ring seal 86 as is shown in Fig. 6 being provided in each end fitting. A piston 88, as shown in Fig. 3, is secured to rod 82, the piston being provided with two oppositely opening emergency relief valves 90 which will be hereinafter referred to. The piston 88 thus forms with the end fittings and the cylinder two damper chambers 89 and 91 on opposite sides of the piston. As is usual in dampers of this type, the piston rod extends sufficiently beyond the end fittings to enable the cylinder to move its full stroke relative to the piston, and suitable boots 92 and 94 (Fig. 2) of flexible material are secured at their opposite ends to the end fittings and to the piston rod to enclose the working parts of the piston rod. The inboard end of piston rod 82 is connected to a vertical pin 96 carried by the upper and lower plates 32 and 34.

The end fittings 62 and 64 are provided with arcuate manifolds 97 and 98 which are connected by upper and lower passages 100 and 102 with corresponding upper and lower ducts 104 and 106 as seen in Figs. 5 to 9. These ducts are received at their opposite ends in suitable recesses in the end fittings and are sealed therein by O-ring seals 108, one of which is shown in Fig. 6. The lower passage 102 in end fitting 62 and the upper passage 100 in end fitting 64 are provided with like relief valves 110, one of which is shown in Fig. 6. Springs 112 normally bias the relief valves 110 to closed position and the pressure setting of these valves can be adjusted by turning a screw threaded plug 114 against which one end of the compression spring 112 abuts. A lock nut 116 is provided to hold the valve in its adjusted position.

From the above it will be understood that as the end fitting 64 moves, for example, toward the piston 88, as viewed in Fig. 7, the relief valve 110 controlling the fluid flow in passage 100 in fitting 64 will open when the pressure of the fluid reaches the predetermined setting of the valve 110. Thus fluid will flow from damper chamber 91 through manifold 98, passage 100 and duct 104 to passage 100 in fitting 62, manifold 97 and the low pressure chamber 89. When the fitting 62 moves toward the piston 88 the relief valve 110 which controls the flow of fluid in passage 102 in fitting 62 will open to admit fluid to the lower conduit 106 from which it is free to flow through passage 102 in fitting 64, manifold 98 and into the damper chamber 91 on the low pressure side of the piston.

On the other side of cylinder 72 from the ducts 104 and 106 a single conduit 118 is provided which is smaller in cross section than ducts 104 and 106 and extends between the end fittings 62 and 64 and enters into confronting recesses therein. The ends of the conduit 118 are provided with O-ring seals 120. As viewed in Fig. 3 the left-hand end of conduit 118 communicates through passages 122 and 123, shown in Fig. 9, with the damper chamber 89 while the right-hand end of conduit 118 communicates with a venturi passage 124 (Fig. 6) and communicating passages 126 and 128 leading to damper chamber 91. As shown in dotted lines in Figs. 5 and 7, the end fitting 64 is provided with a bleed passage 130 which connects the throat of the venturi passage 124 with a fluid reservoir 132 carried by end fitting 64 and freely vented to the atmosphere in the usual manner. This construction is disclosed and claimed in my copending application Serial No. 275,163, filed March 6, 1952, and assigned to the same assignee as this application.

As shown in Fig. 3, the ducts 104 and 106 are interrupted intermediate their ends where they pass through fitting 66. The latter fitting in addition to carrying the damper supporting trunnions 68 also carries a transverse, generally cylindrical valve 134 disposed at one side of cylinder 72 through which the ducts 104, 106 extend transversely. Valve 134 is secured to the end fitting 66 by means of two cap screws 136 which extend through passages 138 in the housing and are threaded into the body of fitting 66. The valve housing encloses a time delay valve in the form of a double acting piston which reciprocates in the cylindrical bore of the housing.

Referring to Fig. 4, it will be noted that the piston assembly of the time delay valve comprises an axial stem 140 having a central piston 142 and integral upper and lower pistons 144 and 146 which are disposed above and below the ducts 104 and 106 in the centered position of the assembly shown in Fig. 4. The pistons 144 and 146 have sufficient axial length to close off ducts 104 and 106 when the piston assembly is moved in one direction or the other. Thus if the piston assembly moves down in Fig. 4, piston 144 will close off duct 104 while duct 106 will remain open. Similarly, if the piston assembly moves up in Fig. 4, piston 146 will close off duct 106 while duct 104 will remain open. The piston assembly is centered in the position shown in Fig. 4 by two compression springs 148 and 149 which engage their respective pistons 144 and 146 at one end and adjustable screw threaded studs 150 at their other ends, the latter being adjustable from outside the damper and secured in adjusted position by lock nuts 152.

The intermediate piston 142 divides the center of the cylindrical valve bore into upper and lower chambers 154 and 156 which communicate with ducts 104 and 106 respectively. Chamber 154 also communicates through a passage 158 with a chamber 160 on the lower side of piston 146, a restricting orifice 162 being provided to limit the flow of fluid through the passage. Chamber 156 similarly is connected through a passage 164 and restricting orifice 166 with a chamber 168 above piston 144.

Operation

As the blade 26 moves about its drag hinge 54 in the plane of blade rotation the damper body including cylinder 72 and fittings 62, 64 and 66 will be moved relative to the piston assembly including piston 88 and piston rod 82, since the piston asssembly of the damper is connected at pivot point 96 to plates 32, 34 of the rotor head and these plates are stationary relative to movements of the blade about its drag hinge. This lag-lead movement is not disturbed by flapping movements of the blade since the bearings 58 and 60 on the flapping hinge extension 52 permit such flapping movement without corresponding movement of the damper.

Figure 10:
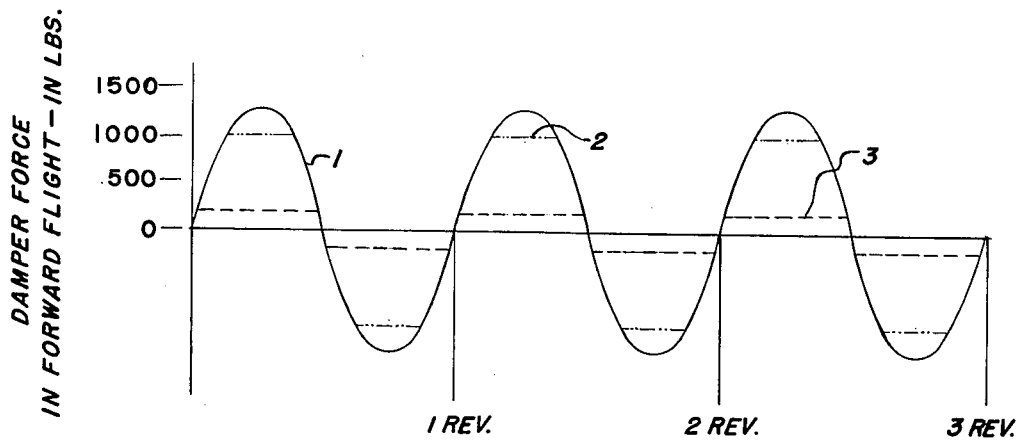
Figs. 10 and 11 are curves showing the damper force when the ship is in forward flight and when on the ground respectively.

Considering first the operation of the damper in normal flight, if a simple hydraulic damper were used the damper forces in forward flight would give curve 1 as shown in full lines in Fig. 10. It will be noted that the frequency of this curve is one cycle per revolution of the rotor and that the damper forces are very high, a condition which is undesirable since the stresses in the blade spar adjacent the root thereof will be so high as to severely limit the life of the blade. By the use of pressure relief valves in the damper as taught in the Buivid patent, previously mentioned, it was possible to obtain sufficient damping of the blade under conditions favorable to ground resonance and still relieve the damper forces in flight to a certain degree. The damper forces of the Buivid damper with the pressure relief valve set to open at the lowest possible pressure which would still give protection against ground resonance produced the curve 2 of Fig. 10. In the Buivid damper the pressure relief valves were set to cut off at a damper force of about 1100 pounds. The use of these pressure relief valves in the damper of the Buivid patent greatly relieved the stress on the blades in forward flight but in order to do this the pressure relief valves had to be set very close to the pressure at which ground resonance tendencies began to develop when the ship was on or near the ground.

By providing the time delay valve 134 in the damper it is possible to set the two pressure relief valves 110 at the optimum pressure for forward flight conditions and these valves in the damper illustrated are accordingly set to open at a damper force of about 200 pounds as distinguished from the 1100 pounds formerly required in the damper of the Buivid patent. This gives the relatively small damping effect which is desired at cruising speed in forward flight as indicated by curve 3 and blade stresses are very low.

Figure 11:
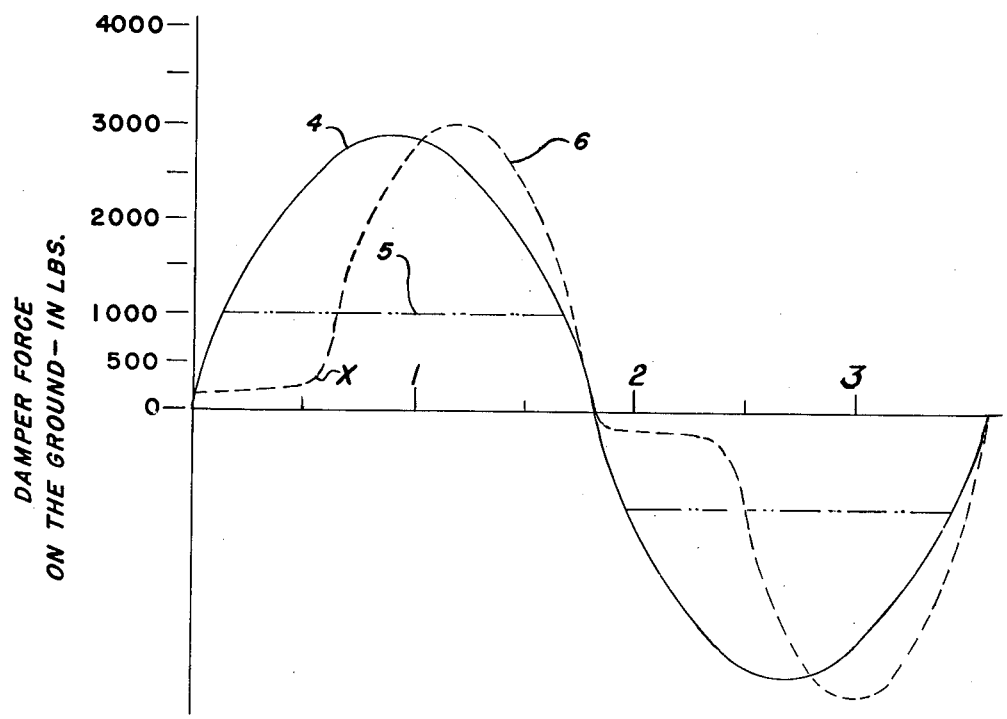

The damping effect, when the ship is on the ground and the frequency of blade oscillation about its drag hinge is one in three to four revolutions of the rotor, is obtained by the restricted venturi passage 124 in the passageway including conduit 118, this restriction being such as to give the optimum damping effect under these conditions favorable to ground resonance. In Fig. 11 curve number 4 corresponds to curve number 1 in Fig. 10 while curve number 5 corresponds to curve number 2 in Fig. 10. Curve number 6 represents the damper force resulting from my improved damper when the ship is on the ground, showing the high damper forces provided by the venturi orifice 124 during each blade oscillation. It will be noted that curve number 6 provides very much greater protection against ground resonance than was formerly provided in the Buivid damper. In other words, curve number 6 in Fig. 11 represents the optimum damping effect for operation on the ground while curve number 3 in Fig. 10 represents the optimum damper effect under flight conditions.

This free choice of damping effect under the two diverse conditions is made possible by the presence of the time delay valve 134 the operation of which will now be described. As previously stated, the forced period of the blade about its drag hinge in forward flight is one per rotor revolution. Considering now that the ship is in normal forward flight and the damper cylinder is moving to the right as shown in Fig. 7, compressing the fluid in damper chamber 89. Fluid will then flow through conduit 118 and venturi 124 but due to the restriction of venturi passage 124 force will build up in the damper chamber 89, manifold 97, and passage 102 in end fitting 62. Valve 110 in end fitting 62 is set to open at about 200 pounds damper force. The pressure will increase momentarily first in passage 100 and duct 104 due to the fact that relief valve 110 in end fitting 64 will act as a check valve in this direction and remain closed. As pressure builds up in passage 104 it flows from chamber 154 of the time delay valve 134 through bleed passage 158 and restriction 162 into chamber 160 where it acts on piston 146 to move the piston assembly slowly upwardly i. e., in a direction to close off duct 106 by piston 146. However, just as fluid begins to enter chamber 160 to close off passage 106, the pressure on the valve 110 in end fitting 62 will exceed 200 pounds causing this valve to open and allowing a flow of fluid through duct 106, passage 102 and manifold 98 in end fitting 64 to the low pressure damper chamber 91. Before the piston assembly can close off duct 106, the damper will reverse its direction and the end fitting 64 will move toward piston 88. Fluid will now flow from damper chamber 91 through passage 102 in fitting 64 and duct 106, to chamber 156 and thence through passage 164, orifice 166 into chamber 168 above piston 144. This will depress the piston assembly and tend to cause piston 144 to cut off duct 104. Before this can occur, the damper will again reverse its direction. Thus it will be evident that in forward flight the time delay valve does not have any effect on the operation of the damper, since the piston assembly never moves for a sufficient time in the same direction to effect cut-off of either duct 104 or 106.

Considering now the operation of the damper when the ship is on or near the ground when the normal period of vibration of the blade about the drag hinge is one per three to four revolutions of the rotor. Under this condition when the end fitting 62 moves towards piston 88 compressing the fluid in damper chamber 89, pressure will increase in passage 100 in end fitting 62, and in duct 104 since the relief valve 110 in end fitting 64 acts as a check valve and remains closed. Fluid from chamber 154 will flow through bleed passage 158, restriction 162 into chamber 160 where it will act on piston 146 to move the piston assembly of the time delay valve upwardly. Up to this point the operation is the same as previously described for "in flight" conditions. Now, however, due to the fact that one cycle of damper operation requires 3 or even 4 revolutions of the rotor the fluid entering the chamber 160 has time to move the piston assembly up until the piston 146 closes off duct 106. This occurs at point X on curve number 6 Fig. 11 after which the pressure builds up during the remainder of the half-cycle. Of course the fluid pressure in manifold 97 and passage 102 of fitting 62 has exceeded the 200 pounds setting of the relief valve 110 of that fitting causing this valve to open; but the piston 146 has closed duct 106 off and hence no flow can take place through this duct 106 to the low pressure side of the piston. From the moment when piston 146 closes off duct 106, at point X on curve 6, the operation of the damper is controlled solely by the restriction to fluid flow through conduit 118 effected by venturi passage 124. The operation of the damper in the other direction during the other half of the damper cycle when the blade is moving in the opposite direction about its drag pivot will be obvious from the above description.

The emergency relief valves 90 in the piston are provided to relieve the damper pressures in the event that the time delay valve 134 should stick in either of its extreme positions in which either duct 104 or duct 106 is closed off. These valves are set to open at pressures at about 3000 pounds damper force and hence during normal operation of the damper would never open.

From the above description of the damper and its operation it will be evident that as a result of the present invention it has been made possible for the first time to obtain the optimum damper force under very different operating conditions i. e. under flight conditions, either power-off or power-on, and under take-off and landing conditions when the ship is on or near the ground and ground resonance is possible.

It will also be evident that this important new result is made possible due to the provision of a time delay valve, new is such dampers, which automatically determines correct damper operation for all conditions of operation of the ship.

Further, it will be clear that as a result of this new combination including the time delay valve, it has now become possible to reduce the stresses on the blades in flight markedly below the level previously possible while at the same time providing increased security against ground resonance when near or on the ground.

While a single embodiment of the invention has been shown for purposes of illustrating the invention, it will be evident that various changes in the construction and arrangement of the parts is contemplated without departing from the scope of the invention.

I claim:

1. A damper including a cylinder, a piston in said cylinder forming damper chambers, means for supplying fluid to said chambers, and means for controlling the damper force as relative movement takes place between said cylinder and piston including passages between said chambers, one of said passages having an orifice therein providing a high damper force, another of said passages having a pressure relief valve therein, and means for restricting the flow of fluid in said latter passage including time delay valve means actuated by pressure of the fluid in the high pressure damper chamber.

2. A hydraulic damper including a cylinder, a double action piston in said cylinder forming a damper chamber on each side of said piston, means for supplying fluid to said chambers, and means for controlling the fluid pressures in said chambers and hence the damper forces including a conduit between said chambers having a restriction providing a high damper force as said piston moves relative to said cylinder, passage means connecting said chambers having relief valves therein one of which is adapted to open whenever the fluid pressure in either of said damper chambers exceeds a predetermined value, and time delay valve means responsive to fluid pressures in said passage means for restricting the fluid flow therein.

3. A hydraulic damper including a cylinder, a double action piston in said cylinder forming a damper chamber on each side of said piston, means for supplying fluid to said chambers, and means for controlling the damper forces including a restricted conduit between said chambers providing a high damper force as said piston moves in said cylinder, passage means connecting said chambers having relief valves therein one of which is adapted to open whenever the fluid pressure in either of said damper chambers exceeds a predetermined value, valve means including cylinder and piston means operated by the pressure of fluid in said damper chambers for restricting the fluid flow through said passage means, and means including bleed passage means for supplying fluid to said cylinder means.

4. A hydraulic damper including a cylinder, a double action piston in said cylinder forming a damper chamber on each side of said piston, means for supplying fluid to said chambers, and means for controlling the damper forces including a restricted conduit between said chambers providing a high damper force as said piston moves relative to said cylinder, passage means connecting said chambers having two oppositely opening relief valves therein, valve means biased into a position leaving said passage means normally open and having means responsive to fluid under pressure in said damper for moving said valve means into passage closing position, and means for limiting the flow of said pressure fluid to said valve means to provide a delayed action of the latter.

5. A hydraulic damper including a cylinder, a double action piston in said cylinder forming a damper chamber on each side of said piston, means for supplying fluid to said chambers, and means for controlling the damper forces including a restricted conduit between said chambers providing a high damper force as said piston moves relative to said cylinder, passage means connecting said chambers having two oppositely opening relief valves therein, and valve means including a cylinder element and a piston element responsive to fluid pressures in said damper for closing said passage means, said piston element having means for biasing it into a position in which said passage means remains open, and bleed means for admitting fluid from the high pressure chamber of said damper into said cylinder element.

6. A hydraulic damper for controlling the lag-lead movements of a rotary wing aircraft blade about its drag hinge comprising relatively movable cylinder and piston elements, said cylinder and piston elements forming two damper chambers on opposite sides of said piston, fluid passage means connecting said chambers including at least two passageways, one of which is more restricted than the other, means for supplying fluid to said chambers, and time delay means located in said other passageway, said time delay means having actuating means responsive to fluid pressure in said damper chambers, said time delay means also having valve means for restricting the fluid flow through said other passageway, said actuating means being operably connected to said valve means.

7. A damper according to claim 6 in which the time delay means includes piston and cylinder means and is responsive to fluid pressures in said chambers and has bleed passage means between said chambers and said cylinder means.

8. A hydraulic damper for rotary wing aircraft including a cylinder and a double acting piston therein forming two damper chambers on opposite sides of said piston, means for providing high damper forces when the aircraft is on the ground and during take-off and landing including a conduit connecting said chambers and having a restriction therein, means for providing low damper forces when the aircraft is in flight including duct means connecting said chambers having pressure relief valves therein, one of which opens when the pressure in either one of said chambers reaches a predetermined value, and time delay valve means located in said duct means responsive to the pressure in said damper chambers for closing off said duct means so that fluid communication between said chambers is possible only through said restricted conduit whenever the pressure in the damper chambers persists for longer than one revolution of the rotary wing of the aircraft.

9. A hydraulic damper including a cylinder and a double acting piston forming a damper chamber on each side of said piston, a conduit connecting said chambers having a restriction therein, two ducts connecting said chambers, each having a pressure relief valve, one of which is set to open whenever the pressure in either chamber exceeds a predetermined value, a time delay valve assembly controlling the flow of fluid through said ducts having a piston associated with each duct, resilient means for centering said assembly with said pistons in duct open positions, and means including restricted passageways for conducting fluid under pressure from each damper chamber to one of said pistons for urging the latter to move said assembly in a direction to close said other duct.

10. A time delay valve for restricting the flow of fluid between two chambers in which the chambers are connected by two ducts, said valve including a cylinder intersecting said ducts, a piston assembly in said cylinder including a piston at each end and an intermediate piston dividing the space between said pistons into two valve chambers, each of which communicates with one of said ducts, one passageway extending from one of said valve chambers to the end of said cylinder adjacent the other chamber having a restriction therein, another passageway extending from the other of said valve chambers to the other end of said cylinder having a restriction therein, and resilient means for centering said piston assembly with said pistons in position to move across and selectively close off either of said ducts upon movement of said assembly in said cylinder under pressure of the fluid in the other of said ducts.

11. A time delay valve for controlling the flow of fluid between two chambers having fluids of different pressures, said valve comprising a pair of ducts, a cylinder intersecting said ducts having end closures, a piston assembly in said cylinder including two end pistons and an intermediate piston dividing the space in said cylinder between said pistons into two chambers, each communicating with one of said ducts, resilient means for normally centering said assembly with said pistons just out of covering relation with said ducts, and means for closing off the duct connection to the low pressure chamber including bleed passages, one passage connecting a first chamber with the end of said cylinder adjacent the other chamber, another passage connecting the other chamber with the end of said cylinder adjacent the first chamber.

12. A time delay valve for controlling the flow of fluid between two chambers, said valve comprising a pair of ducts, a cylinder intersecting said ducts having end closures, a piston assembly in said cylinder including two end pistons and an intermediate piston dividing the space in said cylinder between said pistons into two chambers, each communicating with one of said ducts, resilient means for normally centering said assembly with said pistons just out of covering relation with said ducts, a bleed passage connecting the chamber in communication with a first duct with the end of said cylinder adjacent the other duct, a second bleed passage connecting the chamber in communication with the other duct with the end of said cylinder adjacent the first duct, and means for varying the tension of said resilient means to vary the time required for fluid to displace said assembly in either direction to close off the low pressure duct.

References Cited in the file of this patent

UNITED STATES PATENTS

| | | |
|---|---|---|
| 2,090,843 | King | Aug. 24, 1937 |
| 2,200,578 | Mahon | May 14, 1940 |
| 2,554,774 | Buivid | May 29, 1951 |
| 2,568,214 | Bennett | Sept. 18, 1951 |
| 2,586,180 | Sanford | Feb. 19, 1952 |
| 2,604,953 | Campbell | July 29, 1952 |